United States Patent [19]
Alexander et al.

[11] 3,983,084
[45] Sept. 28, 1976

[54] ART OF MANUFACTURING COMPRESSION MOLDED PARTICLE BOARD WITH NITROGENOUS MODIFIED AMYLACEOUS BINDER

[75] Inventors: Richard J. Alexander, Wauwatosa; Robert K. Krueger, Sheboygan, both of Wis.

[73] Assignee: Krause Milling Company, Milwaukee, Wis.

[22] Filed: Oct. 18, 1974

[21] Appl. No.: 516,055

[52] U.S. Cl. ............................. 260/17.2; 260/17.3; 264/109
[51] Int. Cl.² ......................................... C08L 3/00
[58] Field of Search ........................ 260/17.2, 17.3; 428/528, 529, 326, 533; 264/109

[56] References Cited
UNITED STATES PATENTS
2,282,364   5/1942   Kunze et al. ..................... 106/210
3,725,324   4/1973   Cummisford .................. 260/17.4 ST OTHER PUBLICATIONS
Chem. Absts. 72:45265t, "Plywood Adhesives," Huchette.

Primary Examiner—Edward M. Woodberry
Attorney, Agent, or Firm—Arthur L. Morsell, Jr.

[57] ABSTRACT

A gelatinized amylaceous material, modified with a nitrogen containing compound such as urea, is combined with a synthetic resin, and the mixture is used as a binder which is particularly useful in producing compression molded particle board.

18 Claims, No Drawings

ART OF MANUFACTURING COMPRESSION MOLDED PARTICLE BOARD WITH NITROGENOUS MODIFIED AMYLACEOUS BINDER

BACKGROUND OF THE INVENTION

As defined in the 1973 Book of ASTM Standards, part 16 on wood; adhesives, pp 487–8, particle board is defined as the generic term for a panel (or sheet) manufactured from lignocellulosic materials (usually wood) primarily in the form of discrete pieces or particles, as distinguished from fibers, combined with a synthetic resin binder and bonded together under heat and pressure in a hot-press by a process in which the entire interparticle bond is created by the added binder. The wood particles may be rather large chips or flakes, or small particles such as wood flour or sawdust.

The particle board industry was made possible after World War II as a result of the availability and use of synthetic thermosetting resins, such as urea-formaldehyde, phenolformaldehyde, malamine-formaldehyde and mixtures thereof. These synthetic resins are essential to the production of particle board since particles of wood lack much of the natural interfiber bonding that is possible in both paper and fiberboard.

Particle board is generally produced in flat, multi-platen presses to which a mixture of wood particles and synthetic resin is charged and subjected to fairly high temperatures and pressures for relatively short periods of time. Prior to compression molding in the multi-platen press, the mixture of wood particles and resin may be subjected to the action of a hammermill or attrition mill to reduce the size of the wood particles and to provide an intimate mixture of wood particles and resin. The high temperatures and pressures of the process are essential for the proper curing of the resin and, therefore, satisfactory bonding of the wood particles in the board.

Although particle board is generally produced in large presses, shaped articles can also be produced in smaller molds of specific design using wood particles in combination with synthetic resins. Temperatures, pressures and heating times are similar to those employed with the larger presses as dictated by the strength requirements of the end use.

Particle board is classified on a density basis, which is determined by the amount of pressure applied to the wood particles. Low density board (0.25–0.40 g/cm$^3$) is generally used as panel material for heat and sound insulation. Medium density board (0.40–0.80 g/cm$^3$) is the most commonly produced variety of particle board, while high density board (0.80–1.20 g/cm$^3$) is very similar to conventional hardboard. Both medium and high density particle board are used in furniture construction and in a variety of molded articles such as core plugs, wall plaques, toilet seats and lazy susan trays, to mention a few.

Because of the scarcity and high cost of synthetic resins in recent years, a number of industries have added fillers or extenders such as cereal flours, starches, clays, etc. This practice has generally not been possible in the particle board industry because of the essential role of the synthetic resin in promoting the entire interparticle bond. Common fillers or extenders would only dilute the effectiveness of the resin, and, therefore, reduce the strength of the particle board.

In recent years a product has become available which is produced from gelatinized corn flour and a nitrogen containing compound according to procedures described in U.S. Pat. No. 3,725,324. This product has been used as a binder in drywall taping compounds. We have found that this product, as well as other amylaceous materials produced according to U.S. Pat. No. 3,725,324, can function as resin extenders in producing particle board while retaining the original strength properties of the board. This is a most surprising and unique finding in that most common amylaceous extenders have little or no positive effect on the function properties of the resin or binder with which they are used and only dilute the effect of the binder. However, we believe that the nitrogen containing compound and the gelatinization process used to produce the above described binder, and related amylaceous materials, have a pronounced effects on the properties of the resulting products.

For one thing, the gelatinization process tends to solubilize the starch, making more starch molecules available for interaction or actual chemical bonding. The nitrogen containing compounds are, under certain conditions, solvents for starch and may aid in making starch molecules available for reaction. The hydroxyl groups on the starch molecules offer a potential for reaction with the resin to form permanent covalent or ionic linkages with the resin. Thus the amylaceous material may become a permanent and functional part of the total binder system.

It is known that the nitrogen containing compounds modify the flow characteristics of the amylaceous material. This may allow the amylaceous material to function in a manner similar to the synthetic resins when subjected to high temperatures and pressures of the manufacturing process. The nitrogen compound itself may also enter into a reaction with the resin and become a permanent part of the total binder system. Thus, the amylaceous material of this invention may be functioning more like a resin than an extender in this application.

In addition to retaining strength properties of the board, the binder of U.S. Pat. No. 3,725,324 also retains the water absorption properties of the board, which are extremely important in certain applications. In certain resin systems the use of said binder has even eliminated the need to add materials, such as zinc stearate, which are used to promote good mold release during the manufacture of molded particle board pieces. In certain resin systems said binder of U.S. Pat. No. 3,725,324 has reduced or eliminated the odor of free formaldehyde which frequently accompanies the use of formaldehyde-based resins.

The before-mentioned binder and related amylaceous materials are much less expensive than synthetic resins. Therefore, the use of this binder as an extender of synthetic resins greatly reduces the cost of the total binder system used to produce particle board.

SUMMARY OF THE INVENTION

In the present invention we have found that an amylaceous material, when properly gelatinized and modified with a nitrogen containing compound such as urea, can be used as an extender with synthetic resins to produce a new binder, and this binder may be used to produce a particle board without any measurable loss in strength as compared to particle board made with synthetic resin alone. In some cases, physical properties of the particle board were actually improved when the modified amylaceous material was employed as an extender with the synthetic resin.

DESCRIPTION OF THE INVENTION

The amylaceous binder of the present invention is a cereal grain or an amylaceous fraction thereof which is gelatinized in the presence of a non-volatile starch plasticizer such as urea or a nitrogen compound related to urea using water in an amount less than 20 percent of the total mix with a heating step being performed in the presence of the urea and in the presence of the gelatinized material to bring the temperature to between 115° C. and 180° C. The nitrogen compound is of the family containing the chemical grouping

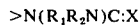

where X is O, S, or NH, and where $R_1$ is H or $CH_3$ and where $R_2$ is H or $CH_3$, and is present in the amount of 3 percent to 20 percent based on the weight of the flour. A specific series of compounds having this grouping would be of the general formula $(R_1R_2N)_2C:X$ where $R_1$ and $R_2$ are H or $CH_3$, and X is O or S.

Alternatively the amylaceous binder is a pregelatinized cereal grain or amylaceous fraction thereof intimately admixed with the plasticizer and then heated to bring the temperature to between 75° C and 180° C to effect an association of the plasticizer with the amylaceous material. A preferred method for simultaneously gelatinizing and heating involves extrusion cooking of the urea treated amylaceous material.

The gelatinization may be performed by any well known method and requires heating the starch in the presence of water to the gelatinization temperature of the starch. Where extrusion cooking is employed, the starch product is extruded into the atmosphere to provide an area of reduced pressure. The extrusion process is generally conducted at a temperature of between 115° C and 177° C at a pressure of between 100 and 350 psi, or greater. Where the extrusion process is employed, the gelatinization and heating are done simultaneously in the presence of the urea, and it is to be understood that, when gelatinization and heating are recited in the claims, gelatinization and heating may be performed simultaneously, as in an extrusion cooking process, or gelatinization may be performed first and heating later, it being essential that heating be done in the presence of both gelatinized amylaceous material and the urea or other nitrogen compound.

The cereal grains or fractions thereof that may be employed include corn flour, bleached gelatinized corn flour. corn starch, grain sorghum flour, milo meal and wheat flour.

The following are examples of nitrogen compounds that may be used: Urea, $(H_2N)_2C:O$; thiourea, $(H_2N)_2C:S$; guanidine, $(H_2N)_2C:NH$; biurea, $[HN(H_2N)C:O]_2$; bluret, $HN[(H_2N)C:O]_2$; dicyandiamide, $NCNH(H_2N)C:NH$.

The synthetic resin of the present invention is a thermosetting resin of the aminoplast variety, such as urea-formaldehyde or melamine-formaldehyde, or of the phenolic or phenol-formaldehyde variety. The total binder system is composed of from 5–50 percent of the amylaceous binder and 50–95 percent of the thermosetting resin.

Particle board made in accordance with the present invention is produced by first intimately blending the amylaceous binder together with the thermosetting resin for 15–30 minutes. This blending or mixing of the two binders is essential for the proper performance of the total binder system. The resin or binder mixture is then blended with the wood particles at a level of 5–20 percent based on the weight of the particles. The wood particles may be derived from either soft wood or hard wood or a mixture thereof. The wood particle-binder mixture is then placed into a suitable mold or press and is heated to 250°–450° F at pressures of 300–2000 psi for 5–20 minutes. The resulting particle board is of the high density variety with densities of 0.80 to 1.20 $g/cm^3$.

The following examples are given to further illustrate the above disclosure and should not be construed as limiting the invention as defined in the claims.

EXAMPLE 1

A series of three phenolic resin-amylaceous binders were prepared by intimately mixing a phenolic resin with the binder of Patent No. 3,725,324. These binders consisted of 90 percent resin + 10 percent of the binder of the prior patent, 80 percent resin + 20 percent of the binder of the prior patent, and 70 percent resin + 30 percent of the binder of the prior patent. These resin-amylaceous binders were further intimately mixed with wood flour to give three different molding compound formulations containing 10 percent total binder. For comparison, molding compounds containing three different levels of the above phenolic resin in wood flour were prepared. For testing purposes, fiberboard specimens having an average density of 1.2 g/cc were compression molded under 900 psi at 350° F using a cure time of 5 minutes. The test results shown in Table I represent an average of four different specimens.

TABLE I

| % Phenolic Resin in Wood Flour | % Binder of Prior Pat. in Wood Flour | Tensile Strength psi | % Absorption After 24 Hours in Water |
|---|---|---|---|
| 10 | 0 | 2480 | 12.3 |
| 9 | 1 | 2380 | 8.3 |
| 8 | 0 | 2190 | 13.0 |
| 8 | 2 | 2410 | 15.1 |
| 7 | 3 | 2500 | 10.9 |
| 6 | 0 | 1810 | 15.2 |

These results demonstrate that particle board of similar or slightly superior properties was produced employing reduced levels of phenolic resin binder in combination with the less expensive binder of said prior patent.

EXAMPLE 2

Two phenolic resin-amylaceous binders were prepared by intimately mixing a phenolic resin of origin which is different than in Example 1 with the binder of U.S. Pat. No. 3,725,324 as cited in Example 1. These binders consisted of 86 % resin + 14% of the binder of said prior patent and 71% resin + 29% of binder of said prior patent. These resinamylaceous binders and three different levels of the phenolic resin alone were intimately blended with a 50:50 mixture of hard and soft wood flours to give five different molding compounds. Particle board test specimens having an average density of 1.1g/cc were formed by compression molding under 400 psi at 335° F for 5 minutes. The test results shown in Table II represent an average of five different specimens.

TABLE II

| % Phenolic Resin in Wood Flour | % Binder of Prior Pat. in Wood Flour | Flexural Strength psi | % Edge Swelling After 24 Hours in Water |
|---|---|---|---|
| 14 | 0 | 8020 | 4.6 |
| 12 | 2 | 8000 | 3.0 |
| 12 | 0 | 7620 | 6.1 |
| 10 | 4 | 7430 | 7.2 |
| 10 | 0 | 6880 | 9.1 |

These results again demonstrate that particle board of good quality was produced employing the less expensive binder of U.S. Pat. No. 3,725,324 as a phenolic resin extender.

EXAMPLE 3

Two different resin-amylaceous binders were prepared by blending a third different phenolic resin with gelatinized grain sorghum flours containing 5 and 10% urea levels. Three molding compounds were prepared by mixing the resinamylaceous binders and the dry phenolic resin alone into mixtures of hard and soft wood flours. Particle board test specimens were compression molded under about 400 psi at 340° F using a cure time of 5 minutes. The test results of Table III represent an average of eight different test specimens.

TABLE III

| % Phenolic Resin in Wood Flour | % Sorghum Flour in Wood Flour | % Urea in Cereal | Strengths psi Flexural | Tensile | % Edge Swelling After 24 Hours in Water |
|---|---|---|---|---|---|
| 10 | 0 | — | 4770 | 2660 | 19.5 |
| 7 | 3 | 5 | 4710 | 2740 | 17.6 |
| 7 | 3 | 10 | 4850 | 2670 | 15.3 |

These results show that amylaceous materials other than gelatinized corn flour can be used in the embodiment of this invention.

EXAMPLE 4

"Lazy Susan" trays of approximately 12 inches diameter and 0.25 inches thickness having an average density of 1.0 g/cc were compression molded from three different binder-wood flour formulations on a commercial production line. The first formulation contained 10% phenolic resin as the sole binder. The second and third formulations contained 8% resin + 2% binder of U.S. Pat. No. 3,725,324 and 6% resin + 4% binder of U.S. Pat. No. 3,725,324, respectively. All trays were of a similar color in final appearance. Testing specimens were cut from similar orientations across the trays and average results are given in Table IV.

TABLE IV

| 10% Total Binder Composition | | Strengths psi | | % Edge Swelling After 24 Hours in Water |
|---|---|---|---|---|
| % Resin | % Binder of Patent No. 3,725,324 | Flexural | Tensile | |
| 10 | 0 | 6880 | 1240 | 8.4 |
| 8 | 2 | 6360 | 1270 | 7.6 |
| 6 | 4 | 6250 | 990 | 21.4 |

These results demonstrate the successful application of the binder of U.S. Pat. No. 3,725,324 as a phenolic resin extender in commercially produced particle board.

EXAMPLE 5

In a second commercial production trial, Lazy Susan trays of similar dimensions and densities as cited in Example 4 were produced from two different binder-wood flour systems. The regular production system consisted of 90% wood flour with 5% phenolic resin + 5% urea-formaldehyde resin as the binder. The improved system in accordance with this present invention consisted of 90% wood flour containing 5% of the phenolic resin + 5% binder of U.S. Pat. No. 3,725,324. Environmentally, the phenolic resin-urea-formaldehyde binder emitted formaldehyde vapors during compression molding whereas the binder system containing the binder of U.S. Pat. No. 3,725,324 was essentially free of this hazard. Testing specimens were again cut from similar locations across the trays and average results are listed in Table V.

TABLE V

| Binder Composition | | Strengths psi | | % Water Absorption After 24 Hours |
|---|---|---|---|---|
| % Phenolic Resin | 5% Level | Flexural | Tensile | |
| 5 | U-F Resin | 5940 | 1270 | 30.0 |
| 5 | Binder of Patent No. 3,725,324 | 6960 | 1390 | 33.4 |

These results demonstrate a complete substitution for a ureaformaldehyde resin by the binder of U.S. Pat. No. 3,725,324 to produce particle board of superior quality under environmentally less hazardous conditions in commercial practice.

What we claim is:

1. A method of manufacturing particle board comprising the following steps:
    a. Preparing an amylaceous binder by combining a nitrogen compound with a gelatinized cereal grain or an amylaceous fraction thereof using water in an amount less than 20 percent of the total mix, and heating the mixture to bring the temperature to between 75° C and 180° C while the gelatinized material and nitrogen compound are both present, the nitrogen compound being in the amount of 3–20 percent based on the weight of the cereal grain and being of the family containing the chemical grouping $$>N(R_1R_2N)C:X$$

where X is O, S or NH and where $R_1$ is H or $CH_3$ and where $R_2$ is H or $CH_3$;

b. intimately mixing a resin selected from the group of urea-formaldehyde, melamine-formaldehyde and phenol-formaldehyde resins or mixture thereof with the amylaceous binder to produce a resin-binder mixture which is composed of from 5–50 percent of the amylaceous binder and of 50–95 percent of the resin;

c. blending a quantity of the resin-binder mixture with wood particles, with said quantity being 5–20 percent of the weight of the wood particles;

d. subjecting the blend of resin-binder mixture and wood particles to heat and pressure.

2. A method as set forth in claim 1 in which the nitrogen compound is urea.

3. A method as set forth in claim 1 in which the nitrogen compound is of the general formula $(R_1R_2N)_2C{:}X$ where $R_1$ and $R_2$ are H or $CH_3$, and X is O or S.

4. A method as set forth in claim 1 in which the nitrogen compound is of the family containing the chemical grouping $$>N(H_2N)C{:}X$$

where X is O, S, or NH.

5. A method as set forth in claim 1 in which the nitrogen compound is selected from the group comprising the following: urea, guanidine, thiourea, biurea, biuret, and dicyandiamide.

6. A method as set forth in claim 1 in which the amylaceous material is selected from a group comprising corn flour, corn starch, grain sorghum flour, corn meal, corn grits, milo meal, milo grits, and wheat flour.

7. As a new composition of matter, a binder comprising an intimate mixture of 50–95 percent of a resin selected from the group of urea-formaldehyde, malamine-formaldehyde and phenol-formaldehyde resins or mixture thereof and 5–50 percent of an amylaceous binder wherein the latter comprises a mixture of a nitrogen compound from the family containing the chemical grouping $$>N(R_1R_2N)C{:}X$$

where X is O, S or NH and where $R_1$ is H or $CH_3$ and where $R_2$ is H or $CH_3$, and a gelatinized cereal grain or an amylaceous fraction thereof with the association of said mixture having been effected by heating to a temperature between 75° C and 180° C, the nitrogen compound being present in the amount of 3–20 percent based upon the weight of the cereal grain.

8. A particle board comprising a blend of wood particles and a resin-binder mixture, with the resin-binder mixture being 5–20 percent of the weight of the wood particles, and said blend having been subjected to a heat of 250°–450° F at pressures of 300–2000 psi for five to twenty minutes, the resin-binder mixture comprising an intimate mixture of 5–50 percent of an amylaceous binder and 50–95 percent of a resin selected from the group of urea-formaldehyde, melamine-formaldehyde and phenol-formaldehyde resins or mixture thereof, the amylaceous binder comprising a mixture of a nitrogen compound from the family containing the chemical grouping $$>N(R_1R_2N)C{:}X$$

where X is O, S or NH and where $R_1$ is H or $CH_3$, and where $R_2$ is H or $CH_3$, and a gelatinized cereal grain or an amylaceous fraction thereof, with the association of said mixture having been effected by heating to a temperature between 70° and 180° C, the nitrogen compound being present in the amount of 3–20 percent based upon the weight of the (amylaceous material) cereal grain.

9. A particle board as claimed in claim 8 in which the nitrogen compound is urea.

10. A particle board as claimed in claim 8 in which the nitrogen compound is selected from a group comprising the following: urea, biurea, biuret, thiourea, guanidine, and dicyandiamide.

11. A particle board as claimed in claim 8 in which the nitrogen compound is of the general formula $(R_1R_2N)_2C{:}X$, where $R_1$ and $R_2$ are H or $CH_3$, and X is O or S.

12. A particle board as claimed in claim 8 in which the nitrogen compound is of the family containing the chemical grouping $$>N(H_2N)C{:}X$$

where X is O, S, or NH.

13. A particle board as claimed in claim 8 in which the amylaceous material is selected from the group comprising the following: corn flour, corn starch, grain sorghum flour, corn meal, corn grits, milo meal, milo grits, and wheat flour.

14. A new composition of matter as claimed in claim 7 in which the nitrogen compound is urea.

15. A new composition of matter as claimed in claim 7 in which the nitrogen compound is selected from a group comprising the following: urea, biurea, biuret, thiourea, guanidine, and dicyandiamide.

16. A new composition of matter as claimed in claim 7 in which the nitrogen compound is of the general formula $(R_1R_2N)_2C{:}X$, where $R_1$ and $R_2$ are H or $CH_3$, and X is O or S.

17. A new composition of matter as claimed in claim 7 in which the nitrogen compound is of the family containing the chemical grouping $$>N(H_2N)C{:}X$$

where X is O, S, or NH.

18. A new composition of matter as claimed in claim 7 in which the amylaceous material is selected from the group comprising the following: corn flour, corn starch, grain sorghum flour, corn meal, corn grits, milo meal, milo grits, and wheat flour.

* * * * *

UNITED STATES PATENT AND TRADEMARK OFFICE
CERTIFICATE OF CORRECTION

PATENT NO. : 3,983,084
DATED : September 28, 1976
INVENTOR(S) : Richard J. Alexander and Robert K. Krueger It is certified that error appears in the above-identified patent and that said Letters Patent are hereby corrected as shown below:

Column 1, line 23, "malamine" should be melamine

Column 2, line 12, "function" should be functional

Column 7, line 36, "malamine" should be melamine

Column 2, line 18, "effects" should be effect

Column 3, line 58, "bluret" should be biuret

Signed and Sealed this

Seventh Day of June 1977

[SEAL]

Attest:

RUTH C. MASON
*Attesting Officer*

C. MARSHALL DANN
*Commissioner of Patents and Trademarks*